Aug. 25, 1964 D. W. ENOCH 3,146,111
SLICED BREAD PACKAGE
Filed Oct. 23, 1962
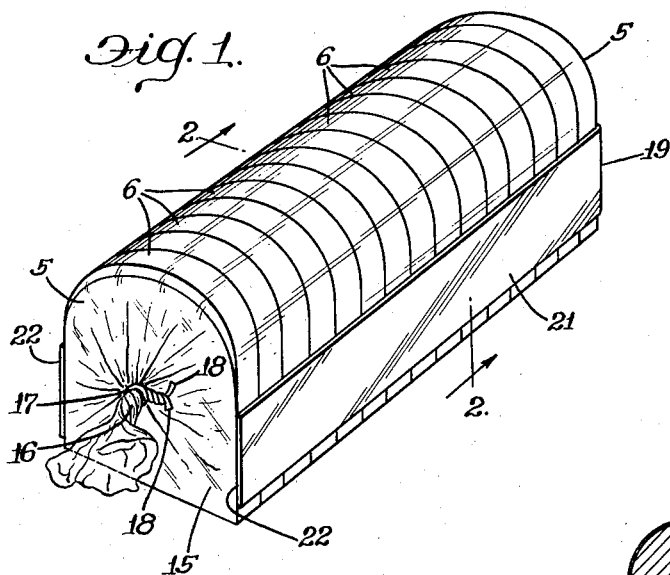
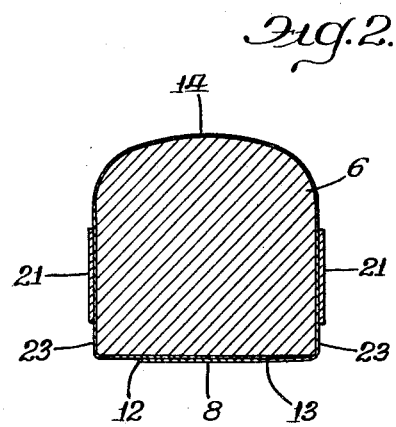
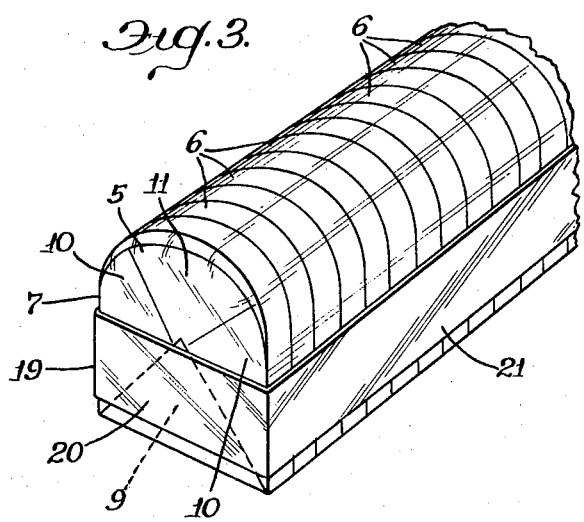
INVENTOR.
Duard W. Enoch
BY
Darbo, Robertson &
Vandenburgh  Attys.

United States Patent Office 3,146,111
Patented Aug. 25, 1964

3,146,111
SLICED BREAD PACKAGE
Duard W. Enoch, Kansas City, Mo., assignor to Interstate Bakeries Corporation, Kansas City, Mo., a corporation of Delaware
Filed Oct. 23, 1962, Ser. No. 232,416
2 Claims. (Cl. 99—173)

In the production of bread on a commercial scale it has been customary for many years to slice the bread before it is packaged. For even a longer period of time, it has been the practice to wrap bread in a sealed wrapper so as to maintain the freshness thereof. While the wrapping of unsliced bread did not involve any great problems, the wrapping of sliced bread has resulted in considerable difficulty being encountered for the user of the sliced bread, in the use of the package in which the sliced bread is put up for selling, which is ordinarily a wrapper of heat sealing material, such as paraffin or waxed paper, thermo-plastic transparent sheet material, or other transparent heat sealing wrapping material.

Due to difficulties that are encountered in connection with printing, on some of the heat sealing materials that are utilized, it has become customary to enclose, within the transparent sealed wrapper, a band of paper, that extends transversely around the loaf of bread, which band carries information thereon such as the name of the producer, the trademark of the producer, and other information. Also, in the ordinary maner of preparing the package, the sheet material, such as waxed paper, or thermoplastic transparent sheet material, that is heat sealed, is folded over at the ends of the loaf and the overlapped plies sealed so as to completely seal and enclose the package at the ends of the loaf, and is provided with a longitudinal overlap along the bottom of the loaf to provide an overlapped seam, which is also heat sealed.

When such a package is opened by breaking the seal at one end thereof and slices of the bread removed, it is impossible, unless a very large amount of the bread is removed, to again close up the package so as to prevent drying out of the slices of the loaf that remain in the package. The package often becomes damaged when the end seal is broken to open it. Thus, even though many slices are removed, the damage may prevent the adequate reclosing of the package. Furthermore, no convenient way is present to hold the package closed once it has been opened. Furthermore the band that encircles the loaf interferes with the replacing of any slices, that were removed from the package, back into the package into their original position, should this be desired.

Due to the nature of the material that is used for the wrapping of the package and the character of the band that encircles the loaf, and the fact that the band is only ordinarily placed around the loaf at the middle of the length of the loaf, and is not very wide, the package is structurally weak. The package does not support the bread slices sufficiently to adequately protect the slices. If the loaf is grasped firmly, or in any other manner is squeezed, or comes in contact with some other object that is harder than the loaf, the slices will become bent, twisted and distorted so that they will no longer be flat, with their cut faces parallel to each other. When so damaged they are not capable of use in toasters that are provided with a slot, that is only slightly wider than the thickness of the slice, for the introduction of the bread into the toaster.

It is a purpose of my invention to provide a package for a sliced loaf of bread that will permit and facilitate the closure of the package after it has once been opened so that any slices of the bread that may have been removed, that it may be desired to replace, can be replaced therein. Through the use of my invention, the package will be capable of being closed up air tight, or substantially air tight, even when only a few slices have been removed or even if no slices are removed. It is possible in connection with my package to inspect the appearance of the sliced bread in the package, by opening one end thereof and removing a slice for inspection, and still be able to reclose the package to its original closed condition, with the slices in their side by side face to face aligned position.

It is a further purpose of my invention to provide a package of the above mentioned character that is not only capable of being opened and re-closed without any difficulty, but which will be of such a character that any slice that is at the end of the row of slices constituting the complete or partially used loaf can be replaced in position in the package in position against the other slices that remain in the package, in face to face relation with each other and with the slice that is replaced, and close the package so that all these slices will be held in position in close face to face engagement in side by side aligned relation so that the cut faces thereof will not dry out.

It is a specific purpose of my invention to provide a sliced bread loaf package having a wrapper of heat sealing material that is wrapped transversely around the loaf tightly so as to conform to the shape of the loaf, which wrapper has its longitudinal edges overlapped and the overlapping portions sealed to each other, and which has one end of the wrapping material folded on itself and sealed in position against one end of the loaf, while the other end of the wrapper extends beyond the other end of the loaf and is bunched with a tie placed around the same so as to tightly close said end. The tie is of a character such that it can be removed to obtain access to the interior of the wrapper to remove the slices of bread therefrom and thereafter readily replaced.

It has become a common practice in order to give a highly desirable appearance to the bread package, to use transparent heat sealing films for wrapping bread, such as polyethylene and polypropylene films. All wrapping materials made of such thermoplastic films, while having the desirable quality of being clear and transparent, are so flexible that a structurally weak package results if such a film is relied on entirely for wrapping the bread. It is a particular advantage to use such thermoplastic films in providing a bread package that is gathered together and twisted to form a tied end on the package, as above referred to. The material has sufficient flexibility to permit it to be readily twisted tightly and the tie placed around the same for tightly closing the end that is capable of being opened and reclosed. While such a bread package can be strengthened by providing an inner ply or wide band of paper extending transversely or longitudinally around the middle portion of the loaf, a band so encircling the loaf inside the wrapper interferes with replacing any slices that were removed from the package, as hereinbefore pointed out.

It is, accordingly, still a further purpose of my invention to provide a bread package of the above referred to character that is provided with a stiffening band exteriorly of the package, that runs longitudinally of the loaf instead of transversely thereof, and which will not in any manner interfere with the removal of slices from or the replacement thereof, in the package. The band is so placed on the package that it will strengthen the same throughout its length and will stiffen the package sufficiently that the sliced bread will not collapse in handling or in stacking the wrapped loaves on top of each other. In order to accomplish this, the band is affixed to the wrapper and extends along longitudinally one side of the package from adjacent the tied end, around the sealed end and back to adjacent the tied end. While the ends of the band preferably terminate in the side portions of the package adjacent the tied end, it is important that these ends be spaced far enough apart transversely of the package so that the band will not in any manner interfere with the opening and closing of the package at the tied end. The band should not restrict the width of the opening provided in the tied end, when it is untied and opened. Thus, it always permits the ready removal from and the insertion of the slices back into the package, should this be desired. In order to provide the desired stiffness to the package, the band is made of waxed or paraffin paper, or coated with some other suitable low temperature thermoplastic adhesive, and sealed to the package in position with portions thereof running along the sides and the one end of the package.

It is a further purpose of my invention to provide a method of packaging a sliced loaf of bread comprising holding the slices of the loaf in face to face engagement while passing heat sealing plastic film wrapping material wider than the length of the loaf around the loaf transversely thereof in close engagement with the loaf to conform the wrapping material to the shape of the loaf, providing an overlapped seam lengthwise of the loaf with the wrapping material extending endwise beyond the loaf at a greater distance at one end than at the other end thereof, folding the extended wrapping material in the usual manner against the end of the loaf at which the shorter extending portion of the wrapper is located, sealing the plies of the folded material and of the longitudinal seam to each other, gathering and bunching the wrapping material having the longer extension from the end of the loaf together and applying a flexible tie member around the bunched material to tightly close the last mentioned end of the package, and positioning a band of paper having a heat sealing coating thereon lengthwise around the package in the manner referred to and heat sealing the band to the wrapping material.

One feature of my invention is that it facilitates applying the labeling data, e.g., brand name, manufacturer, etc., to the package. Since many of the films employed for the package are difficult and/or expensive to print on, the bread manufacturer may desire to avoid doing so. Furthermore, if the wrapper is printed, it requires that it be exactly positioned on the loaf to achieve the best appearing package. These problems are alleviated if the printing is applied to the supplemental band which is sealed to the wrapper in my invention.

Other objects and advantages of my invention will be apparent from the following description taken in conjunction with the drawings in which:

FIGURE 1 is a perspective view showing the bread package as viewed from the tied end thereof;

FIGURE 2 is a transverse vertical sectional view through the package; and

FIGURE 3 is a view similar to FIGURE 1 as viewed from the sealed end of the package, partly broken away.

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose; as it is these that meet the requirements of pointing out the parts, improvements, or combinations in which the inventive concepts are found.

Referring in detail to the drawings, in FIGURE 1 is shown a sliced loaf of bread having the heels 5 and the slices 6 between the heels 5. In the ordinary commercial bakery, the bread, in sliced condition, passes from a slicing machine to a wrapping and sealing machine. Suitable means are provided in all commercial wrapping and sealing machines for holding the slices of bread in position in face to face relationship after these have been sliced and until sufficient of the wrapping material has been placed around the same to hold the slices in position. With some machines the wrapper comes in a continuous length that is fed off a roll and it is passed around the loaf transversely so that the cut-off length of the wrapper extends around the loaf completely and overlaps longitudinally on the underside of the loaf. In other machines, precut sheets are employed in a similar manner. In the ordinary wrapping machine the ends of the wrapper are folded so as to enclose the ends of the loaf at the heel portions 5 and the plies of the folded wrapper are sealed to each other to seal the package. An end label often is placed over the sealed end only.

In carrying out my invention the wrapping machine is modified so that this folding and sealing action only takes place on the one end of the package indicated by the numeral 7 in FIGURE 3, this end of the package being closed by the folded plies of the sheet material of the wrapper, which are heat sealed to each other. Similarly, the overlapping plies comprising the longitudinal edge portions of the wrapper are sealed to each other where the same are overlapped, as shown at 8 in FIGURE 2. In order that the other end of the wrapper can be bunched and tied, the wrapping material used is of greater width than for the ordinary wrapping operation, in which both ends of the package are sealed. Furthermore, the wrapping material is positioned with respect to the sliced loaf, so that a greater length thereof extends beyond the end of the loaf that is to have the tied closure than beyond the end of the loaf that is to have the sealed closure.

The usual way of folding and sealing the end 7 of the wrapper is by folding the bottom portion 9 of the wrapper at the sealed end upwardly, the side portions 10 toward each other and the top portion 11 downwardly, the portions 9, 10 and 11 overlapping each other. While a particular fold is shown in FIGURE 3, this may be varied slightly as may be found desirable, as long as the portions 9, 10 and 11 are so lapped that they will completely enclose the ends of the loaf and will have portions thereof in face to face engagement that can be heat sealed to each other. In carrying out this folding operation, the folding is actually against the heel portion 5 at the end of the loaf. The two overlapping longitudinal edge portions 12 and 13 of the wrapper forming the lapped seam 8 and the end flaps are sealed by heat and pressure to each other and this may be done either simultaneously or successively. The seals are then either permitted to cool or are cooled by suitable cooling means, well known, for congealing the seals so that the plies are firmly held together and the package is firmly sealed at one end and the bottom thereof.

The sheet material of which the wrapper 14 is made is of a heat sealing material that is thin, flexible and transparent. Preferably thermoplastic films are used for this purpose, such as polyethylene and polypropylene.

After the sealing above referred to has been completed, the package will have a portion of the wrapper projecting out beyond the end of the package that is opposite the sealed end. This projecting, somewhat tubular, portion is gathered as shown at 15 and twisted as shown at 16 in FIGURE 1, and secured in such gathered twisted condition by a tie member of a flexible character shown at 17. Said tie member is applied as closely as possible to the end of the loaf so that it will hold the wrapper at the end 7 of the loaf closely in engagement with the heel 5 at said end of the loaf. The tie member is preferably a ductile metal wire, or of other similar ductile material, that may be provided with a coating or covering, as may be found desirable. A thin wire in a plastic or cellulose jacket to increase the surface area in contact with the wrapper is eminently suitable as a tie. The tie member extends one or more turns around the twisted portion 16 of the wrapper and is twisted on itself to complete the tying operation. The ends 18 thereof extend beyond the twist in the tie member so that these can be readily engaged with the fingers for untwisting the tie, removal and opening of the package. The twisting of the gathered end before the tie is applied insures that the end is tightly closed. In many instances however, the tubular portion merely will be gathered and bunched, which can be performed without twisting.

The slices are thus held securely against movement relative to each other in close face to face relation. However, in order to provide a transparent wrapper for the package and a material that can be readily bunched to provide the closure at the end of the loaf provided with the tie thereon, the wrapping material is preferably of great flexibility. Because of the flexibility necessary for the provision of the bunched and tied end closure, the materials suitable for use as such a wrapper do not have the desired strength to maintain the package in this condition with the slices all located in longitudinal alignment with each other and in face to face, side by side relation, during the handling of the wrapped loaf in transporting it from the bakery to the place of sale and from the place of sale to the ultimate user. The more rigid the package the less is the likelihood that the slices will tilt out of their normal position perpendicular to the bottom of the loaf, when a number of the sliced loaves so wrapped are stacked on top of each other or the package is otherwise subjected to pressure transversely of the loaf.

In order to provide suitable stiffening means for the package without in any way interfering with the insertion of slices into and removal of slices from the package, a band of paper 19, which is preferably waxed or paraffin paper, or paper coated with any other suitable low temperature thermoplastic sealing material, is applied to the sides and the sealed end of the package. This band has a transverse portion 20 running across the sealed end of the package and portions 21 extending lengthwise of the longitudinal sides of the package. The portions 21 have their ends 22 located at or near the ends of the package sides that are adjacent the gathered, twisted and tied end of the package. Said longitudinally extending portions 21 of the band should not extend beyond the point where the gathered end of the wrapper meets the side portion of the wrapper so that a full width opening will be provided in the package when the tie is removed and the tied end of the package opened up.

The band 19 is preferably made of a width somewhat less than the height of the side of the package and is spaced from both the bottom and top of the side wall portions 23 of the package. Obviously any desired printed matter can be provided thereon, such as advertising matter, the name of the product, and so on. The band 19 is heat sealed to the side walls 23 of the wrapper and to the material of the folded end 7 thereof. As the stiffening band 19 is completely on the outside of the package and free of the end that is to be opened, it will not in any way interfere with the use of the package, as there is nothing inside the wrapper that will in any way interfere with the sliding of a slice 6 lengthwise of the package inside the wrapper, either into a position next to another slice or out of that position to remove it from the package.

If it is desired to open the package to remove a slice all that is necessary is to unfasten the tie 17 by untwisting it and opening the bunched portion of the wrapper to provide ready access to the slices within the wrapper. The slices then can be removed one by one as may be desired. After such removal the package again can be closed by gathering together and manually twisting the end of the wrapper so that it is against the slice 6 or heel 5 remaining at that end in the wrapper, should the heel 5 have been replaced next to the first remaining slice. After twisting or otherwise bunching the end of the wrapper the tie is replaced. This will then hold the remaining slices in position in the wrapper in close face to face engagement with each other so that they will not become dry on the cut surfaces thereof. Due to the fact that the wrapper has been pulled tightly around the loaf during the wrapping operation, each slice will fit closely in the portion of the wrapper provided for it and will thus be held in upright position in face to face relation with the adjacent slices. If too many slices were removed, the same can be replaced in the package in the position in which they were in the package originally. To do this, the end that has the tie thereon is reopened, the slices that it is desired to replace inserted in the package and the package reclosed in the manner above described.

The band 19 will not in any manner interfere with these operations, even though the package may be emptied to such an extent that only a small portion of the loaf will remain in the wrapper. Under which conditions the manually twisted portion of the wrapper will include a portion of the band 19. However, the band 19 is not of such width that it would seriously interfere with and prevent a twist in the wrapper under those circumstances. Furthermore, since the band is sealed to the wrapper it will be bunched therewith during the twisting. It is to be understood that while the band stiffens the package so as to prevent distortion of the sliced loaf in handling, being made of paper, it does not have sufficient stiffness that will prevent the manual twisting of the wrapper at the open end of the package when the band is included in the twisted portion. Furthermore, when the twisted end of the package is opened up fully to remove a slice, even if the band has been included in the twisted portion, as after the loaf had been used to a considerable extent, the opening between the ends of the band will always be the same for free passage of the slices through the open end of the wrapper.

I claim:

1. A sliced bread loaf package comprising a wrapper of heat sealable flexible sheet material tightly wrapped transversely around said loaf to closely fit the same to provide a longer and a shorter end on said wrapper at opposite ends of said loaf, said shorter end of said wrapper being folded on itself in overlapping plies against one end of the loaf with said plies heat sealed to each other to form a closure for one end of the package, said wrapper having its longitudinal edges overlapped throughout the length of said loaf on the underside thereof and heat sealed to each other in position to hold said wrapper closely around said loaf in loaf conforming relation thereto, the longer end of said wrapper being bunched and tied closely adjacent the other end of said loaf to form a closure for the other end of said package, and a U-shaped reinforcing band having two ends, said band extending along the two longitudinal sides and across the sealed end of said package externally of said wrapper with the opposite ends of said band located in transversely spaced relation to each other at the tied end of said package, said band being sealed to said wrapper.

2. A sliced bread loaf package comprising a wrapper of heat sealable flexible sheet material tightly wrapped transversely around said loaf to closely fit the same to provide a longer and a shorter end on said wrapper at opposite ends of said loaf, said shorter end of said wrapper being folded on itself in overlapping plies against one end of the loaf with said plies heat sealed to each other to form a closure for one end of the package, said wrapper having its longitudinal edges overlapped throughout the length of said loaf on the underside thereof and heat sealed to each other in position to hold said wrapper closely around said loaf in loaf conforming relation thereto, the longer end of said wrapper being bunched closely adjacent the other end of said loaf, a ductile tie about the bunched portion and twisted together to form a reusable closure for the other end of said package, and a U-shaped reinforcing band of paper with two ends, said band having a heat sealable coating thereon, said band being positioned on the exterior of said wrapper and extending along the two longitudinal sides and across the sealed end of said package with said ends of said band being positioned on the sides of said package adjacent the tied end thereof to permit opening of said package at said tied end, said band having a width less than the height of said longitudinal sides, said band being heat sealed to the wrapper.

References Cited in the file of this patent

UNITED STATES PATENTS

| | | |
|---|---|---|
| 1,816,399 | Rohwedder | July 28, 1931 |
| 1,864,493 | LaBombard et al. | June 21, 1932 |
| 3,066,848 | Billeb | Dec. 4, 1962 |

OTHER REFERENCES

Bakers Weekly, November 1, 1954, p. 47.
Food, March 1958, p. 10.